MAGNETIC CORE LOGICAL DEVICE

Filed Aug. 22, 1956 6 Sheets-Sheet 1

INVENTOR.
EDWIN W. BAUER
BY
William V. Schelberg
AGENT

MAGNETIC CORE LOGICAL DEVICE

Filed Aug. 22, 1956 6 Sheets-Sheet 4

Feb. 12, 1963 E. W. BAUER 3,077,582

MAGNETIC CORE LOGICAL DEVICE

Filed Aug. 22, 1956 6 Sheets-Sheet 6

United States Patent Office 3,077,582

Patented Feb. 12, 1963

3,077,582

MAGNETIC CORE LOGICAL DEVICE

Edwin W. Bauer, Poughkeepsie, N.Y., assignor to International Business Machines Corporation, New York, N.Y., a corporation of New York Filed Aug. 22, 1956, Ser. No. 605,603
25 Claims. (Cl. 340—174)

The present invention relates to apparatus for performing binary logical operations and is directed in particular to multi-path magnetic structures employed for this purpose and adapted to provide output signals having sufficient energy to directly control other magnetic devices or operate comparable electrical loads.

Heretofore logical components of this kind have used electromagnetic relays or circuits using electron tubes, which have the disadvantage of slow speed or lack of reliability and long life, or magnetic arrangements that require at least two cores and associated winding circuits.

A broad objective of the present invention is to provide such logical devices employing a single magnetic element, which devices may operate as an "exclusive or" circuit, an "inclusive or" circuit, a "not" or inverter circuit, an "and not" circuit, an "and" or coincidence circuit, or to otherwise function as a component that may recognize the receipt of a particular sequence of applied pulses.

In accordance with the invention a single magnetic core is provided with one or more windings operative to set it to either one or the other stable residual flux state, an output winding for detecting a change in the magnetic state, and one or more control windings positioned about portions of the magnetic circuit and passing through an opening or openings positioned through the principal flux path of the core, to which pulses are applied.

Cores of this general type have been disclosed in the copending United States Patent application, Serial Number 383,568, filed October 1, 1953 on behalf of E. A. Brown, now U.S. Patent 2,902,676 and, as described therein, may be placed in an information representing remanence state and subsequently the state established may be determined by pulsing a winding passing through a hole or holes in the core without loss of the stored information.

Certain logical components employing cores of this type are also disclosed in the copending United States Patent application, Serial Number 530,524, filed August 25, 1955, on behalf of E. A. Brown, now U.S. Patent 2,991,455. In one of the arrangements shown, a pair of control windings are placed through an opening provided in the main flux path and, when energized in coincidence with current of proper direction, are operative to establish a reversed remanence state which flux change may be detected. In another embodiment a pair of windings are arranged through three spaced holes and are energized in coincidence to read the established remanence state of the core. A further device employs a pair of interrogate windings, each positioned through a separate pair of spaced holes, and functioning to sample the remanence state of the core non-destructively as an "exclusive or" device.

Non-destructive sensing or logical sampling is accomplished in the core arrangements described in the aforementioned application and output signals are delivered that are of lesser magnitude than those provided by a destructive sensing operation where the information representing flux state is reversed. A first such non-destructive sensing or sampling pulse provides an appreciable output signal at the time this input is received, however, subsequent control or sampling pulses, while producing signals distinctive as to phase, have considerably lesser power.

In accordance with the improved mode of operation proposed as one feature of the present invention, a second large output signal is delivered at any desired time as gated by a set or reset pulse so that the logical elements function as power gates rather than as transformers. The sequence of pulse delivery relative to gate and information pulses may be readily distinguished since, if the reset pulse is the first to be applied, no appreciable output is developed, while if the control pulse is the first applied, then with the following reset pulse a large output signal is obtained.

In each of the several logical arrangements to be described output signals may be obtained concurrently with the application of input or control signals, or the occurrence of a particular logical combination of control signals may be stored and later delivered to the output, depending upon the improved mode of operation requiring use of set and reset windings whereupon logical devices of improved flexibility are provided. In addition, various arrangements of input or control windings are provided in accordance with the invention, each of which contributes to added flexibility of operation and has distinctive operating advantages as will be clarified in the description to follow.

Accordingly, the principal object of the invention is to provide improved logical circuit devices capable of detecting a coincidence of several input signals, the exclusive presence of a single input or the absence of inputs through the use of a single multi-path magnetic core element.

A specific object of the invention is to provide an improved magnetic core "exclusive or" circuit.

Another specific object of the invention is to provide an improved magnetic "inclusive or" circuit.

Another object of the invention is to provide an improved "and not" logical circuit employing magnetic cores.

Still another object of the invention is to provide an improved magnetic core "not" circuit.

Another object of the invention is to provide an improved magnetic core "and" logical circuit.

A further object of the invention is to provide a device capable of recognizing the receipt of a plurality of pulses in particular sequence and subsequently indicating compliance or non-compliance with a particular sequence.

Still another object of the invention is to provide a magnetic core device capable of non-destructive sensing while having the ability to deliver output pulses of sufficient power to switch a further magnetic core or operate a comparable load without the use of supplemental amplifying means.

A still further object of the invention is to provide a logical device selectively operable with or without the feature of logical information storage.

Other objects of the invention will be pointed out in the following description and claims and illustrated in the accompanying drawings, which disclose, by way of example, the principle of the invention and the best mode, which has been contemplated, of applying that principle.

circuits using modified arrangements of the output windings.

Figure 15:
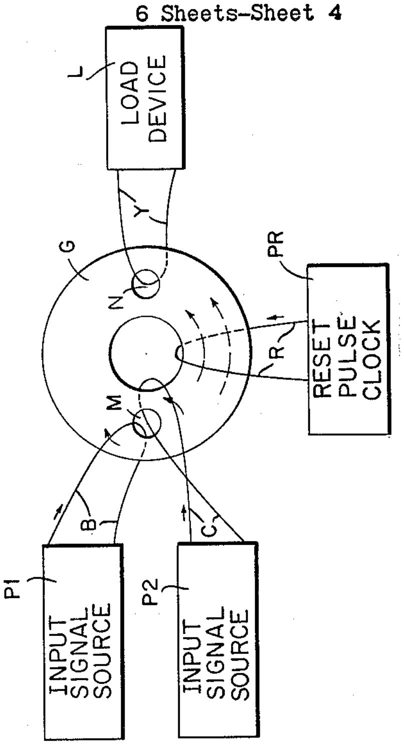
Figure 16:
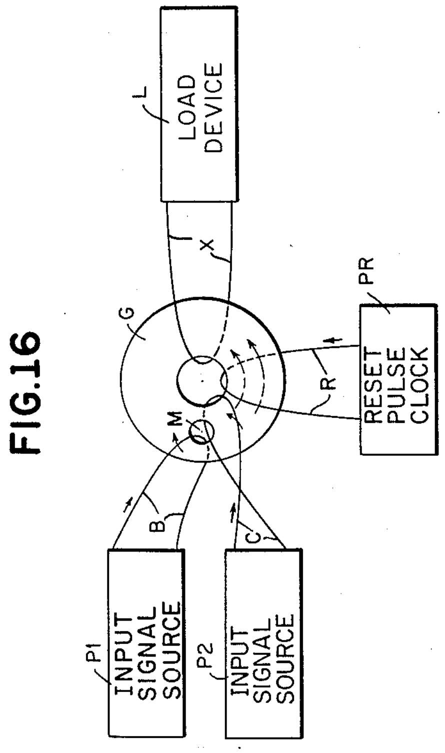

FIGURES 15 and 16 illustrate forms of the device employing other control and output winding arrangements and operable as an "and" circuit.

Figure 17:
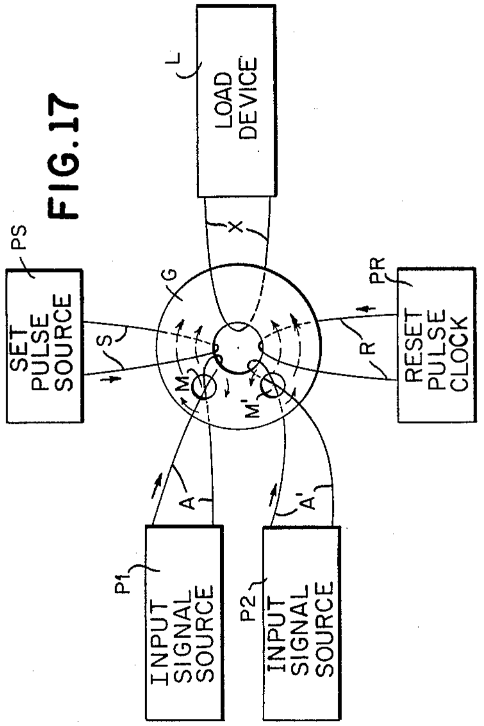
Figure 19:
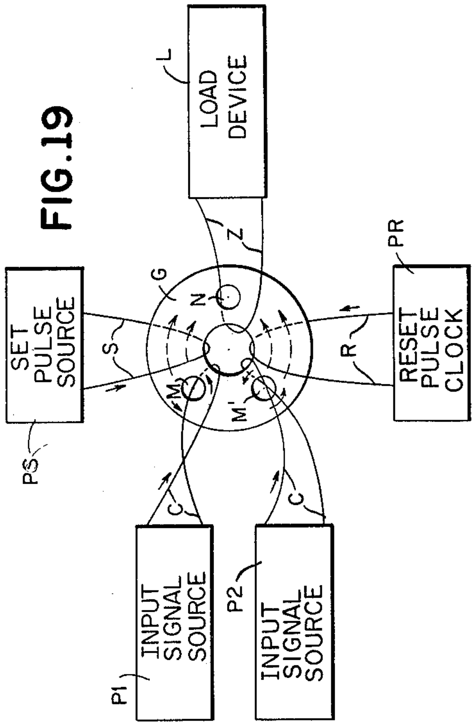
Figure 18:
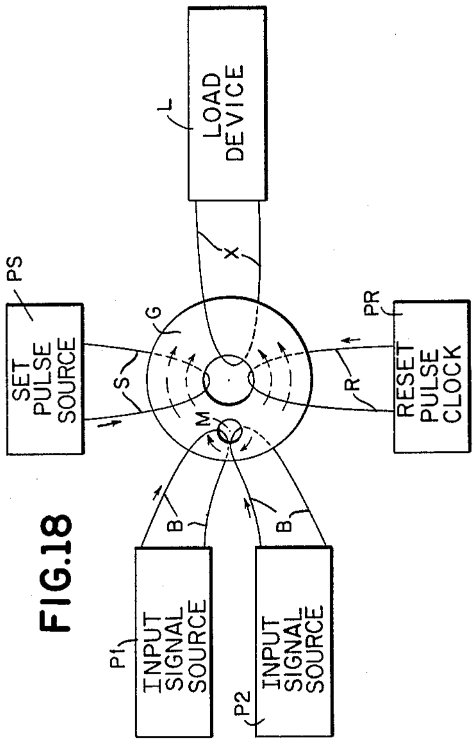

FIGURES 17, 18 and 19 illustrate forms of the device operable as an "and not" logical circuit.

FIGURES 20, 21, 22 and 23 illustrate forms of the device operable as a "not" logical component.

Binary information may be represented by stable states of remanence attained by magnetic materials and these states may be established and controlled by the application of appropriate magnetomotive forces. Magnetic materials for such usage may have a somewhat rectangular hysteresis characteristic such as that illustrated in FIGURE 1, however, the devices according to the present invention are not necessarily limited to use of materials having a high ratio of residual to saturation flux density as depicted. Points "*a*" and "*b*" on the hysteresis characteristic shown in FIGURE 1 indicate opposite states of remanence flux density and either of these two states may be selected as a datum condition. For example, if point "*b*" is selected as representing a binary zero, then a binary one is represented by remanence point "*a*" and such information is stored by applying a positive magnetizing force greater than the coercive force through pulsing a winding on a core of this material so as to cause the hysteresis loop to be traversed from point "*b*" to point "*e*" and, on relaxation of the force, to point "*a*." A binary zero information bit may be stored by failure to apply a magnetomotive force or by applying a force in the negative sense to cause the loop to be traversed from point "*b*" to point "*f*" and thereafter to point "*b*" when the force terminates. Other remanence points intermediate the points "*a*" and "*b*" may also be employed as a datum or information representing state and it is to be understood that the explanation given is not to be considered limiting in this regard.

In conventional usage, information that is stored in this manner in a magnetic core is destroyed on sensing, with readout comprising the application of a negative magnetomotive force sufficient to cause a change in remanence state and determining whether a significant flux change is developed as indicated by a voltage appearing on an output winding embracing the core. If such a voltage is developed, then it is recognized that a "one" had been stored but the core is returned to a zero information representing state or point "*b*."

Non-destructive sensing, as described more fully in the aforementioned copending applications, results in a determination of the residual flux state without resetting the core to the datum position. This is accomplished by pulsing a sample or interrogate winding which links the magnetic circuit through an aperture or apertures so as to produce an auxiliary flux influencing the remanence flux. Such action appears to reduce the remanence flux substantially, however, its initial direction of polarity is not destroyed even with continued application of sensing pulses. To describe this action as it is presently understood, consider a core storing a binary one condition as point "*a*" in FIGURE 1. Operation of the sample winding by energization with a pulse of sufficient magnitude first causes the core to traverse the hysteresis loop and establish a flux density position at point "*c*," about which point further interrogate pulses cause a minor hysteresis loop to be traversed repeatedly as illustrated. A similar action takes place if a binary zero is stored by setting the core to point "*b*," with point "*d*" initially attained on sampling and thereafter the minor excursions taking place about this latter point.

Figures 1, 2:
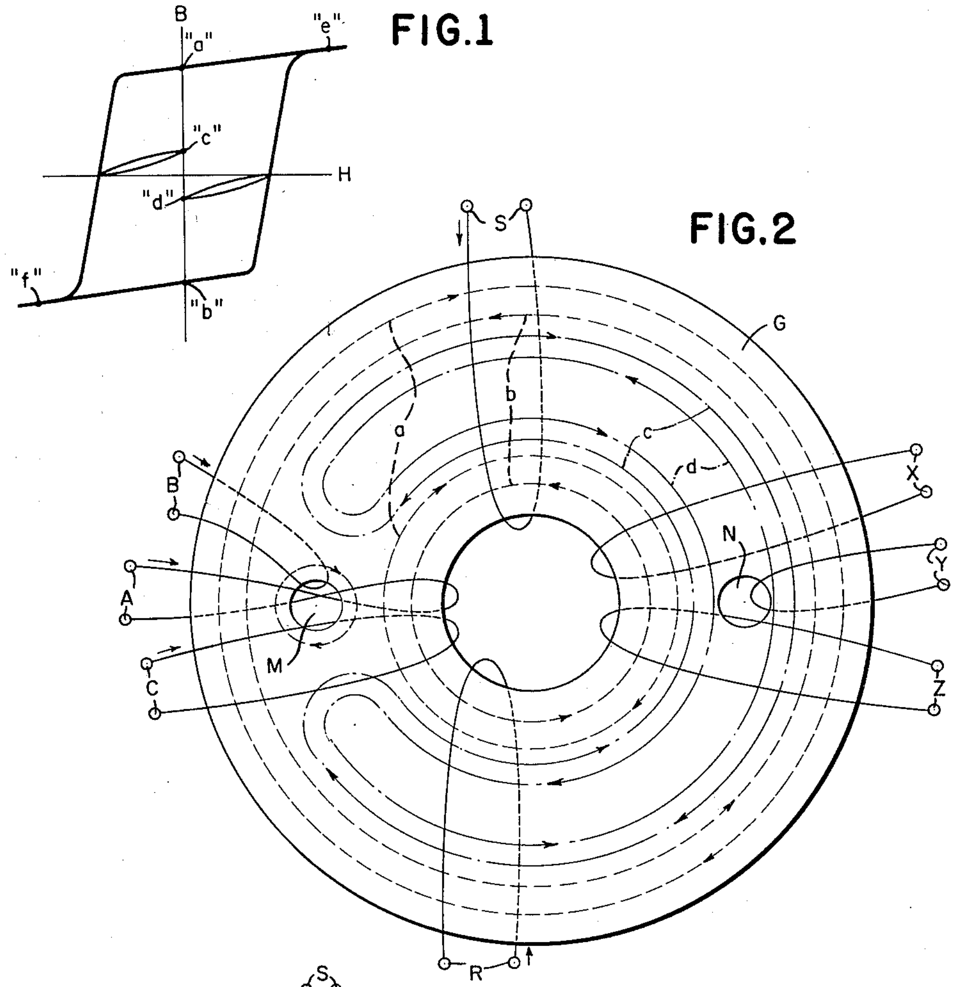
FIGURE 1 represents a typical hysteresis characteristic for a magnetic core of the type used in the circuits of this invention.
FIGURE 2 is a schematic representation of one form of a single magnetic core illustrating multiple flux paths established therein and used in explanation of the operation of the several logical devices.

The action that takes place may be visualized more clearly by the magnetic structure shown in FIGURE 2 where certain flux paths, established by pulsing windings on a core G, are illustrated. The core may be toroidal, rectangular or of other configuration as desired. A winding S links the principal flux path provided by the core and, for purposes of explanation, when pulsed with current in the direction shown in the drawings, will establish a flux in a clockwise direction around the core and designated "*a*." A pulse of opposite polarity applied to the winding S or a pulse of the same polarity applied to a similar but oppositely wound coil R will establish flux in a counterclockwise direction around the core as represented by point "*b*" on the hysteresis diagram of FIGURE 1. An output winding X links the complete magnetic circuit and, if the flux directions are reversed, an induced voltage is developed as a result. A control or input coil A is also provided in the form of a figure eight winding linking the core through an opening M. Pulsing this winding in the polarity shown and with the current direction employed for resetting using coil S, establishes a localized flux circulation around the hole M in a clockwise sense. If this input pulse polarity were reversed or if the winding polarity were reversed, the sense of the localized flux would be counterclockwise. Localized circulation in either direction, however, increases the reluctance of this core section and causes the main flux, "*a*" or "*b*" to reverse in the inner radial portion of the remainder of the magnetic circuit and form a kidney shaped flux pattern indicated on the figure as "*c*" and "*d*," respectively. When this occurs, the winding X experiences a substantial flux change but less than that with a complete flux reversal. Since the outer portions of the crescent or kidney shaped flux pattern is longer than the inner, there is a preponderance of magnetic domains oriented in the original remanence direction so that the direction and consequently the stored information is not destroyed. This fact is indicated on the hysteresis loop with points "*c*" and "*d*" displaced toward their initial remanence directions along the B axis. With each pulsing of the sample winding A, a minor loop excursion takes place developing an output signal indicative of this memory direction.

It has been determined that certain operational advantages may be obtained with input and output winding arrangements other than A and X and additional input windings B and C and output windings Y and Z are illustrated. First considering the input windings, A, B and C, it will be recalled that the figure eight loop A functions to cause a crescent shaped flux pattern to be developed regardless of the input pulse polarity or the remanence flux direction. Windings B and C, which link the outer and inner portions of the main flux path, respectively, are polarity sensitive and will cause this flux pattern to occur only when the flux set up locally within the portion linked by the input winding is in a direction opposed to the remanence flux. The output windings Y and Z are threaded through a further opening N in the core so as to link the outer and inner portions of the main flux path, respectively, and also provide certain desirable operational features. For example, since establishment of the kidney shaped remanence flux causes a change in direction only in the inner core portion, only the winding Z will detect such an occurrence while the winding Y, on the other hand, will detect a complete reversal in the remanence state when the core is reset to the opposite state. The winding X, however, will detect any net change in the flux density.

Figure 3:
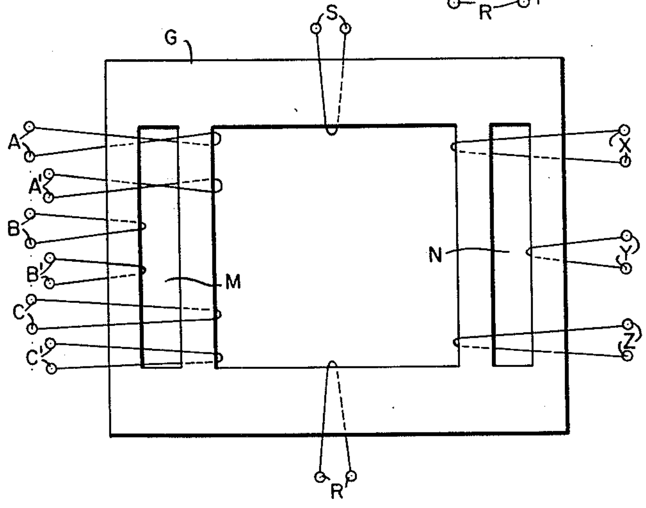
FIGURE 3 represents a composite logical circuit element and illustrates a modified form of the magnetic core structure.

Referring now to FIGURE 3, a structure is shown which is equivalent to the toroidal core G shown in FIGURE 2 but with rectangular input and output openings M and N. Windings A, B and C are provided about the input end of the structure and through the opening M and, in addition, windings $A^1$, $B^1$ and $C^1$ are provided that are poled in an opposite sense. Windings R and S are provided as before along with the several output winding arrangements X, Y and Z. By employing certain pairs of these input windings and a selected one of the output windings, the device shown in FIGURE 3 may be caused to function as any one of the aforementioned basic logical devices and this component may therefore be used as a logical circuit building block. In the interest of winding economy, however, coils that are not employed for the performance of particular logical functions may be eliminated as illustrated in the embodiments subsequently described. In these embodiments, windings that are comparable to those shown in FIGURE 3 are given lettered designations that may be identified with the winding type illustrated with this universal element.

To perform an "exclusive or" function it is necessary that no output signal be obtained when neither one of a pair of inputs is present or when both inputs are present, and for this usage a pair of figure eight input coils are employed that are wound in opposition. Input pulses of proper phase relationship to one another and simultaneously applied to these windings will cancel their effects and consequently no kidneying of the main flux takes place and no output signal is delivered. On the other hand, either one of the windings acting alone will produce the kidneyed flux pattern.

Figure 4:
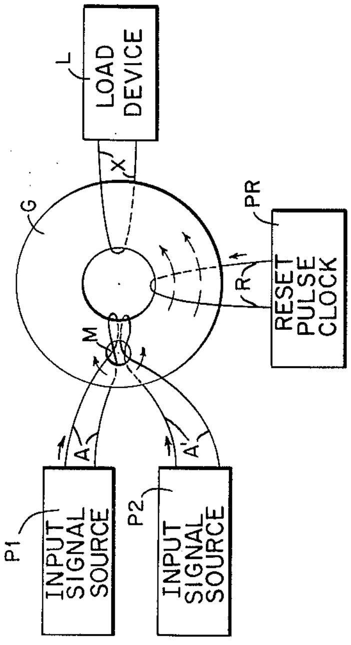

Referring now to FIGURE 4, a winding R comparable to the similarly designated coil in FIGURES 2 and 3, embraces the core G and functions to reset the core to a datum position, which may be assumed to be counterclockwise and represented as point "*b*" on the hysteresis loop of FIGURE 1 for purposes of the following explanation. An output winding X also embraces the core and is adapted to deliver output pulses to a load device L which may be the winding of a further magnetic core. As shown, the core G is provided only with an input opening M positioned preferably through the center line of the principal flux path of the magnetic circuit and, while shown here to be perpendicular to the plane of the core, may be positioned radially or at any other desired angle. Figure eight windings designated A and A′ are positioned through the aperture M and are wound in opposition to one another. Pulse generators P1, P2 and PR are shown schematically for providing current pulses to the windings A, A′ and R, respectively, in the directions shown. In explaining the operation of the device, the reset winding R is assumed to have been energized by the source PR so that the core stands at point "*b*" on the hysteresis loop. Energization of winding A or A′ alone then causes a localized flux circulation about the opening M and the hysteresis loop representing the core as a whole is traversed from point "*b*" to point "*d*." With each such input pulse applied to the winding A or A′ an output pulse is delivered through the winding X. The first pulse of a series of pulses that may be thus delivered by winding X is of considerably greater magnitude than the subsequent output pulses since the output winding experiences a total net change in flux density represented by the difference between points "*b*" and "*d*," whereas subsequent pulses cause the minor loop to be traversed with a lesser flux change. Input pulses applied to the winding A operate in identical manner as those applied to the winding A′ even though these two windings are oppositely poled since the shift in flux density and kidneying action is independent of the polarity of the pulses applied to the figure eight windings.

The "exclusive or" function performed by the device as described delivers its output indication immediately upon application of the inputs to one of the windings A or A′, however, the logical indication may be delayed if desired for delivery at a predetermined later time after receipt of the inputs. After an input time interval has elapsed, the winding R may be pulsed with an output pulse then delivered, if only one of the inputs has been received, as a flux shift from point "*d*" to point "*b*" then occurs. If no input signals are received, or if both have been delivered, with the windings bucking one another the core remains at point "*b*" and no appreciable flux change takes place when the reset pulse is applied tending to drive the core from point "*b*" to point "*f*."

In functioning as an "inclusive or" logical device, figure eight windings A and A′ may be energized so as to cause a like direction of localized flux around the aperture M or either two windings of type A or two windings of type A′ may be employed, in which case either one or both windings produce the crescent shaped flux pattern.

The advantages in applicant's use of the reset winding R for both "inclusive or" or "exclusive or" functions resides in allowing both the large flux change produced by the first simultaneous or exclusive application of input pulses, and the large flux change produced by erasing the crescent shaped flux condition at a subsequent reset time, to be used for inducing the output signal. In this latter manner of operation, the logical information is stored in the core and controls the gating of power supplied by the reset pulse source and delivered to the output. Such a flux change and power transfer is sufficient to supply enough energy to the winding X to allow operation of further magnetic core devices or other loads without requirement of further amplification.

While the circuit illustrated in FIGURE 4 is capable of performing the logical functions of "exclusive or" and "inclusive or" as described and has marked simplicity as well as improved capabilities in that it will deliver at least two pulses of sufficient magnitude to operate a significant load without intermediate amplification means, it may also operate to recognize a particular sequence of applied pulses. For example, with the datum remanence flux direction "*b*" initially established, the sequence of application of a pulse to the winding R and a pulse to one of the windings A or A′ may be determined. With winding R pulsed beforehand, the flux excursion from point "*b*" to point "*f*" occurs and no output is delivered from the winding X. With one of the windings A or A′ pulsed and the core flux kidneyed, an output is developed and this sequence of delivery may be determined at any subsequent time by pulsing the winding R at such a desired time.

In the arrangement shown in FIGURE 4 with the figure eight type input windings embracing the core through the same opening M, these windings are tightly coupled and input signals applied to one may cause a voltage to be developed in the other that may be objectionable particularly when a low impedance pulse source is employed. This coupling action may not be desirable in arrangements employing other magnetic core devices as the sources P1 and P2 as flux changes may be erroneously established in them.

Figure 5:
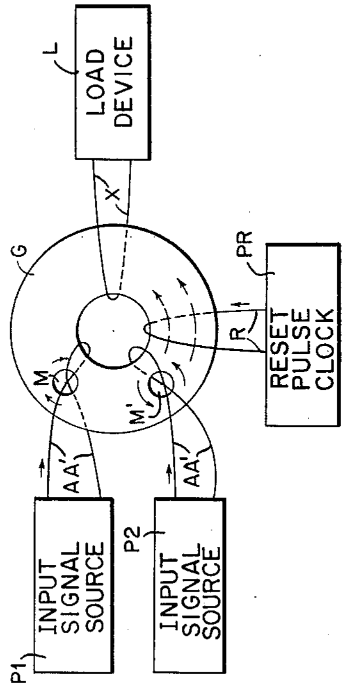
FIGURES 4 to 11 illustrate forms of the device operable as "inclusive" and "exclusive or" circuits, using modified arrangements of control windings.

In another arrangement, individual openings M and M′ may be provided for each input winding of this type as shown in the embodiment of FIGURE 5. This arrangement will function as an "inclusive or" circuit since a localized flux circulation about either one or both of the holes will cause the main flux to assume a kidney shaped pattern and the holes may be separated by any desired amount. Either one or both of the input signal windings shown in this embodiment may be of type A or A′. In this arrangement there is coupling between the input windings only with the first input pulse received and thereafter the windings are substantially isolated from one another.

Figure 6:
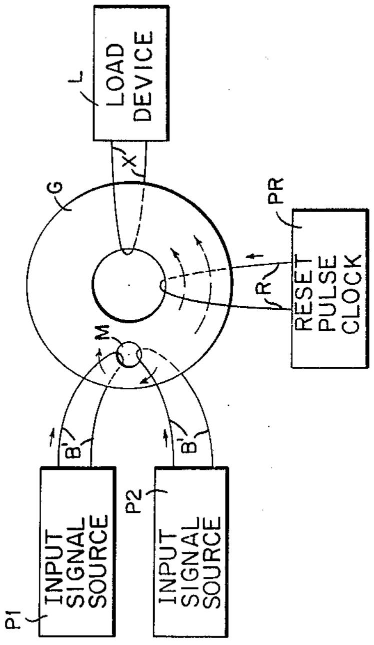

A further input winding arrangement is shown in FIGURE 6, adapted only for the "inclusive or" function and having close coupling between a pair of input windings B′ which have the characteristic of being polarity sensitive. It has been determined that when the magnetomotive force applied by windings of types B, B′, C and C′ to the inner or outer portion of the magnetic circuit embraced by them are in a sense opposed to the established remanence direction, the main flux will assume the crescent shaped form, however, where the magnetomotive force is in the same direction as the remanence flux direction, no permanent flux change occurs. With the reset winding R poled as shown and pulsed with current in the direction indicated, a remanence flux is set up in a counterclockwise sense around the core. Pulses applied to one or the other or both of the windings B′ from the sources P1 and/or P2 tend to establish a flux in opposition to this remanent flux and cause the crescent shaped flux pattern to be attained, as before described, with an output signal developed at input time or at a desired later time when a subsequent reset pulse is applied. Obviously, the original remanence flux direction may be reversed, with input windings of type B used or, the direction of the pulses applied to the input windings B′ may be changed, with similar result obtained.

Figure 7:
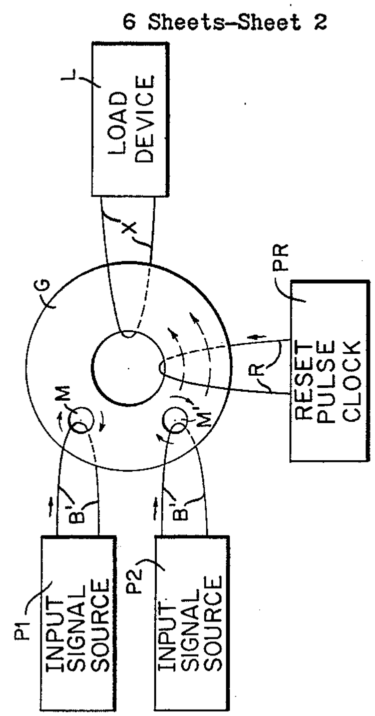

As in the embodiment of FIGURE 4, however, there is close coupling between the input windings and in instances where this is found objectionable an arrangement shown in FIGURE 7 may be employed.

Here the input windings B′ are positioned through separate openings M and M′ that are spaced apart from one another. Operation of either one of the pulse sources P1 or P2 causes the main flux to reverse in the inner radial volume of the core as before. It may be noted that the holes M and M′ may be spaced apart a maximum distance when diametrically opposed, and two distinct kidney shaped flux patterns of equal size are established in each of which patterns the flux direction in the inner radial portion only is reversed.

Figure 9:
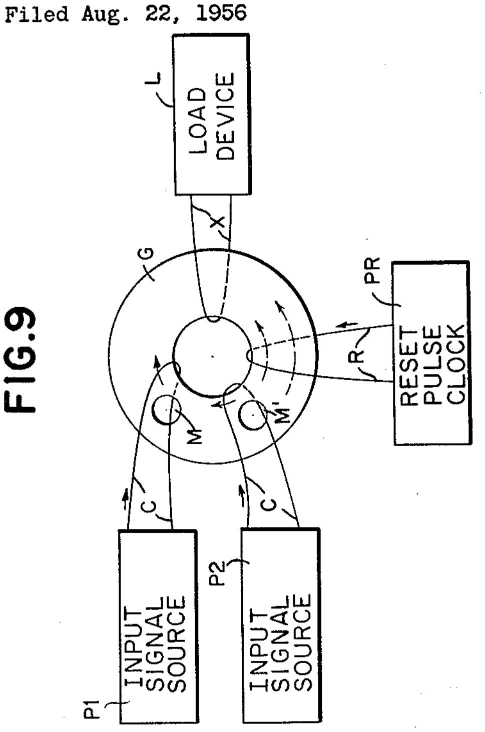
Figure 8:
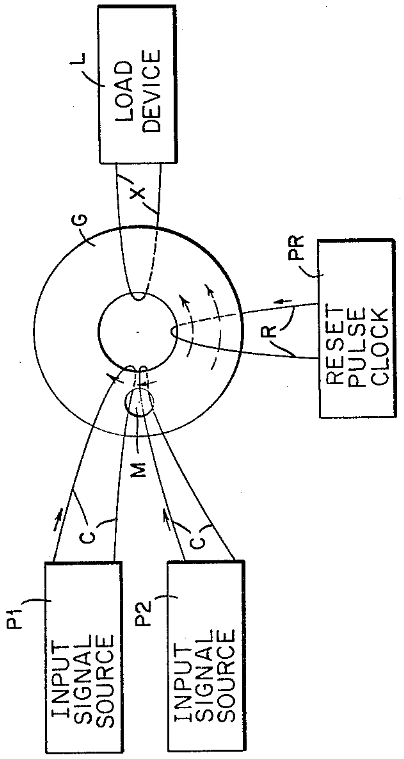

Still another modification of the input windings usable with the basic magnetic element is shown in FIGURE 8 where input windings both of type C are positioned through the input opening M so as to embrace only the inner radial portion of the main flux path. Again the principle applies that the auxiliary flux established in the portion linked by the input windings must oppose the remanent flux direction to cause the kidney shaped main flux pattern to be established. A difference in operating parameters is involved, however, in that a lesser amount of energy is required to cause such action as compared with windings of type B or B′ linking only the outer portion of the main flux path. The arrangement of FIGURE 8 is also polarity sensitive and the windings are close coupled. Another embodiment is obtained by positioning the windings C through separate input holes M and M′ as shown in FIGURE 9. Since the reset flux direction illustrated in FIGURES 8 and 9 is counterclockwise, the input windings must be of type C but it is obvious that opposite polarity windings of type C′ would be required if the reset direction were reversed.

Figure 10:
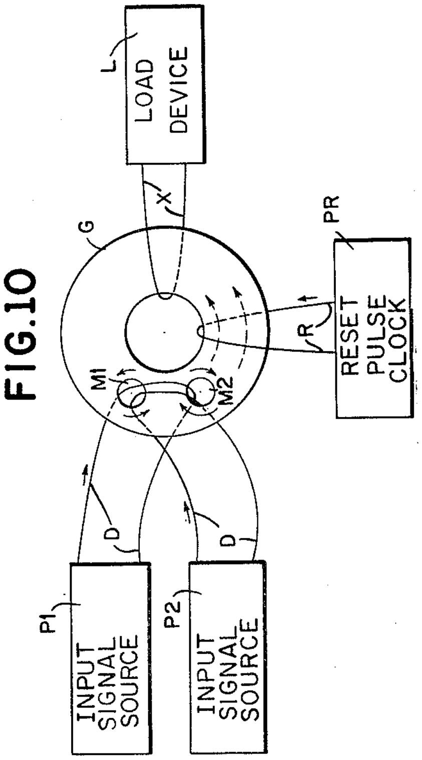

The embodiment illustrated in FIGURE 10, like that of FIGURE 4, is operable both as an "inclusive or" and as an "exclusive or" logical device dependent upon the winding or pulse polarity employed. In this arrangement, however, two auxiliary openings M1 and M2 are provided through the main flux path of the core substantially on the center line with windings labeled D embracing that portion of the magnetic material intermediate the openings. In this embodiment the windings D are equivalent to type A and A′, respectively, and the device is not polarity sensitive. If the magnetomotive force provided by pulsing one winding is in the same sense as the other an "inclusive or" function takes place while if it is opposed on simultaneous pulsing they are cancelled out and an "exclusive or" function takes place as is evident from the prior description. This arrangement like that of FIGURE 4 couples both the input windings closely.

Figure 11:
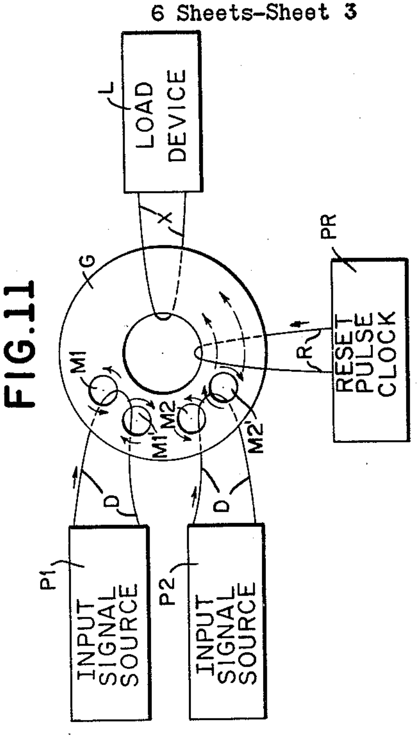

The coupling may be reduced to a point where substantial isolation is obtained by separation of the windings but the ability to function as "exclusive or" circuit is removed in so doing. Such an arrangement is shown in FIGURE 11 where pairs of holes M1—M1′ and M2—M2′ are provided and spaced in a manner comparable to the embodiments shown in FIGURES 5, 7 and 9, above mentioned.

Figure 12:
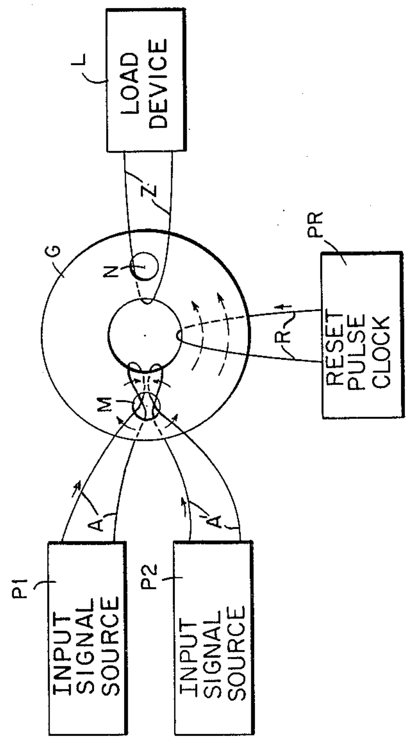

Up to this point in the description, variations in the arrangement of signal input windings have been shown while using an output winding of the type X that embraces the complete flux path. Certain modification of the output winding arrangement may also be provided on these structures with advantageous result in application to load circuits of high or low impedance. One such output configuration is illustrated in FIGURE 12 where an output aperture N is provided in the core with a winding of type Z arranged through this opening so as to embrace only the inner half of the core at a point remote from the input opening M. An arrangement of input windings A and A′ is shown like that in FIGURE 4, however, any of the input winding configurations of type A, B, C or D, as shown in FIGURES 5 through 11 may be used with similar result in so far as the winding Z is affected by causing the crescent shaped main flux pattern to be developed. With the main flux initially established in a counterclockwise direction as indicated by the arrows adjacent the reset winding R, selection of input pulse polarity or winding sense for input windings of all but the figure eight type windings and type D windings so as to oppose this flux direction, is necessary to establish the kidney flux pattern. Likewise, the input windings must be opposed and closely coupled to provide the "exclusive or" input conditions. If the inputs are wound or pulsed in an aiding sense "inclusive or" input conditions are established. When such an input condition occurs as to cause the crescent shaped flux pattern to develop, or when the core is reset, the flux change takes place only in the inner portion of the core and winding Z is fully effective in both instances to develop an output signal.

Figure 14:
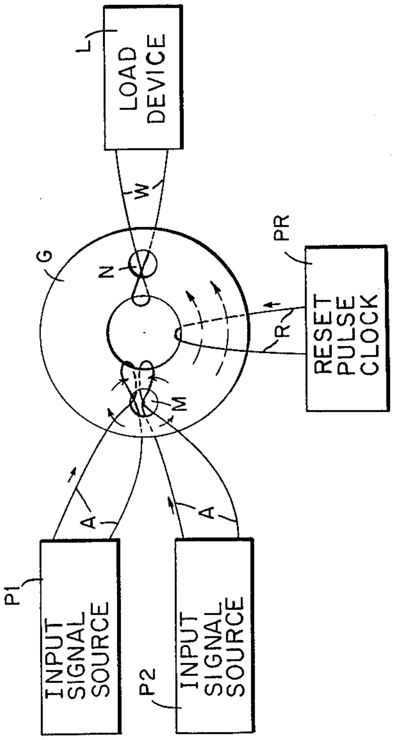

An output winding configuration W in the form of a figure eight may also be arranged through the hole N with similar results and is equivalent to using a combination of windings of type Y and Z properly connected to one another. This arrangement is shown in FIGURE 14 where it may be observed that the flux change on both input and reset conditions is effective to develop an induced voltage only on the inner one of winding loops of the figure eight winding W.

The arrangement of output windings about a part or about the whole of the magnetic circuit has certain advantages but care must be taken to avoid use of low impedance loads in most instances as under this condition the winding may function as a shorted turn that will oppose any change of flux in the localized area it encompasses.

Figure 13:
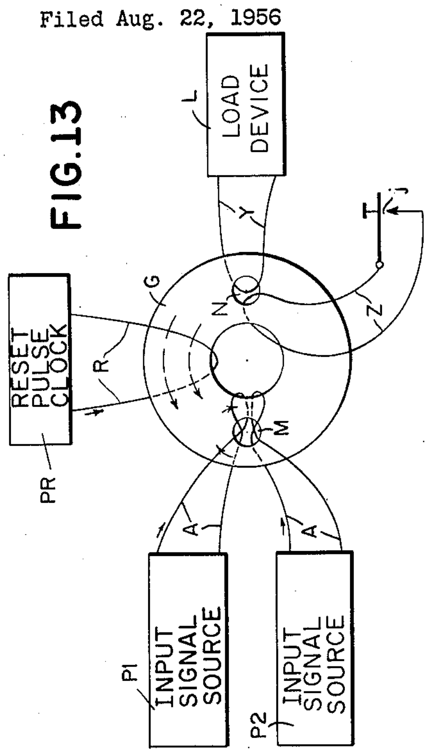
FIGURES 12, 13 and 14 illustrate modifications of the device operable as an "exclusive or" or "inclusive or"

Constructive use of short circuited windings may also be used effectively in such devices as described. For example, in FIGURE 4, with an output winding of type Y used linking only the outer flux path no signal would be developed when the input signal caused the crescent shaped flux pattern to occur, however, if the inner flux path were linked by a shorted turn the flux change occurs in the outer section of the core and an output is obtained. Such an arrangement is shown in FIGURE 13 where the shorted turn winding comprises a winding of type Z which may be short circuited by a switch *j* that is shown schematically as a manually operated element.

An arrangement of an output winding Y linking only the outer portion of the core as illustrated in FIGURE 15, has certain advantages for an "and" logical device. With such a device an output is desired only when both input signals are received and not with a single input or with neither input. For this purpose, windings B and C are provided linking the outer and inner input sections of the magnetic circuit. As mentioned heretofore opening M may be radial, with the "and" input windings linking equal parts of both inner and outer flux paths and advantage obtained in that the input winding impedances are symmetrical. Pulsing either one of these windings alone in the current direction shown for the particular winding sense so as to produce a magnetomotive force in the section linked that is opposed to the particular remanence flux direction set up initially by the reset winding R will cause kidneying of the main flux. No flux change is experienced by the winding Y under this input condition or when the core is reset at some subsequent time. With both input signals applied in coincidence however, the windings B and C acting together force a complete flux reversal throughout the core and the winding Y detects this change at input time and again at the time the core is reset by the winding R.

The "and" function can be obtained with an X type output winding positioned about the entire core as shown in FIGURE 16, but not as effectively. With reference to this figure, and considering the flux conditions represented by the hysteresis loop of FIGURE 1, the initial reset state after winding R is pulsed is represented by point "*b*" and either one of the input signals sets the core to "*d*" with this change in flux density between points "*b*" and "*d*" causing an output signal at input time. Then when the core is reset the flux traversal is from point "*d*" back to "*b*" so as to develop an output of equal magnitude at reset time. With both inputs applied the flux traversal is from points "*b*" to "*a*" at input time and from points "*a*" to "*b*" on reset with the result that amplitude discrimination or use of integration is required to distinguish the conditions of a single input signal and both input signals and function as an "and" logical device.

Employing the input windings of types B and C and output windings of types Y and Z, both "inclusive or" and "and" outputs may be obtained to indicate the receipt of an input pulse on either one of the A and B windings through the winding Z, or receipt of both inputs through the output winding Y.

A logical circuit device for performing an "and not" function is shown in FIGURE 17 where the core G is provided with input signal windings A and A' arranged in the form of figure eight loops through openings M and M' respectively. Reset winding R and output winding X embrace the entire main flux path of the core as in previous arrangements. A further winding S is provided in this embodiment linking the main flux path and poled to develop flux in a clockwise direction around the core. When the reset winding R is pulsed, state "*b*" is established and at some subsequent time when an output is required, the winding S is pulsed to establish state "*a*." With neither input pulse source P1 or P2 operated in the interim, a reversal in flux occurs from "*b*" to "*a*" and a large output signal is developed on the output winding X. If either one or both input signals are received before the winding S is pulsed, however, the main flux is caused to assume the crescent shaped pattern and the core is established at point "*d*" so that the following energization of the set winding S causes a flux change from "*d*" to "*a*" which develops an output signal of substantially half the magnitude as would otherwise be obtained, and may be amplitude discriminated by the load L.

The input winding arrangement employed for another form of "and not" device is shown in FIGURE 18 where the arrangement of input windings is like that used for the "inclusive or" device of FIGURE 6, however, any one of the input winding configurations of types A, B or C, arranged as shown in FIGURES 4, 5, 6, 7, 8, 9, 10 or 11 may be used with the limitation that where a single input opening M is employed the input windings must be pulsed or wound in an aiding sense, as pointed out in connection with these embodiments for use in performing an "inclusive or" function. The particular B type input winding arrangement shown in FIGURE 18 is employed merely as an example to illustrate the operation as "and not" device. In this figure the pair of input windings are arranged to link the outer portion of the main flux path through the input hole M and each is to be pulsed so as to develop a flux component in a clockwise direction through this section and opposed to the counterclockwise flux set up by the reset winding R. Since either one or both input signals causes the crescent shaped flux pattern to develop, the flux change and consequent signal on output winding X is less than that obtained on a complete flux reversal when the set winding S is pulsed.

It may be pointed out that each of the input winding arrangements that may be employed for the "and not" function devices, as in the "inclusive or" devices described heretofore, provide the distinct characteristics of close coupling, isolation, polarity sensitivity and the like. It may also be shown that the arrangement of the output winding may be modified with certain advantages and for this purpose a further embodiment of the "and not" device is shown in FIGURE 19 using the type C input winding arrangement, for illustration purposes, with a type Z output winding arrangement.

Referring now to FIGURE 19, an input winding C comprises a single loop embracing the inner portions of the main flux path of the core through an opening M while an additional input winding C links the inner portion of the main flux path through an opening M' that is apart from opening M. This arrangement provides a polarity sensitive input system, loosely coupled after the first input is received, just as in the "inclusive or" function device shown in FIGURE 9. The set and reset windings R and S are pulsed so as to produce flux circulation of opposite sense as in previous figures. The output winding Z is arranged through opening N so as to link only the inner portion of the core. Now, pulsing the reset winding R establishes a counterclockwise remanence flux represented as at "*b*." Either one or both of the input windings may be pulsed in the direction indicated in the figure and cause development of the crescent shaped flux pattern with the flux in the inner half of the core reversed in direction. At output time, when the winding S is pulsed, there is no significant flux change in the portion of the core linked by the output winding if a kidneying of the flux has previously occurred, whereas, without an input signal having been applied, a large output signal is developed. It is obvious that this type Z output winding arrangement may be used with any one of the various input winding arrangements described to form a variety of "and not" devices with desired polarity sensitivity and coupling characteristics.

Figure 20:
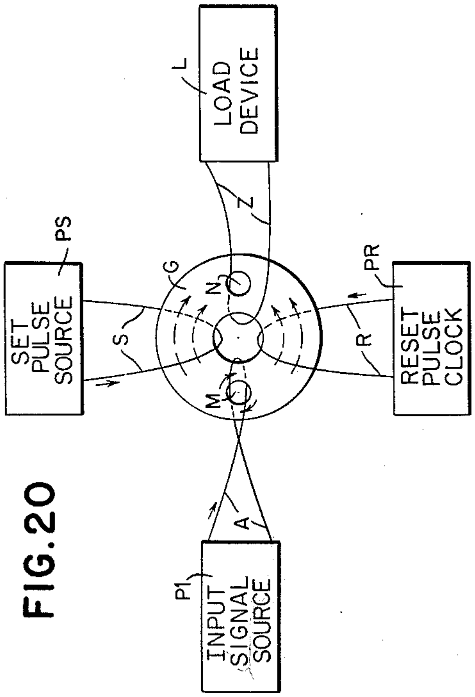

A logical "not" or inverter circuit can be provided using forms of the input winding arrangements described heretofore and adapted to cause the remanence flux to be established in the crescent shaped pattern. Referring now to FIGURE 20, a figure eight input winding of type A may be arranged through opening M with an output winding of type Z arranged through opening N so as to embrace only the inner portion of the magnetic circuit. The sequence of operation to perform the "not" or inverter logic comprises application of a pulse to the reset winding R followed by a pulse to the set winding S after an input time interval has elapsed and at a period when an output signal is desired. With no input signal applied to the input winding from source P1, the flux is reversed from points "*b*" to "*a*" at output time and a large output signal is developed on winding Z. On the other hand, if an input is received after the winding R has reset the core to "*b*" the crescent shaped flux pattern occurs with the flux in the inner part of the core reversed. Subsequent operation of winding S causes no flux change to take place in the region linked by winding Z so that the presence of an input pulse results in no output signal. The type A input winding arrangement shown is not polarity sensitve, however, other windings that are effective to cause kidneying only on one polarity of the input pulse, as winding types B and C, may be used with the identical output result. In addition, the output winding Z may be a type X winding arranged to link the complete flux path and thus develop a signal of half amplitude with an input signal applied as compared to a full amplitude without an input. Furthermore, with the use of a shorted winding about the inner flux path as in FIGURE 13, an output winding of type Y may be used effectively.

Figure 21:
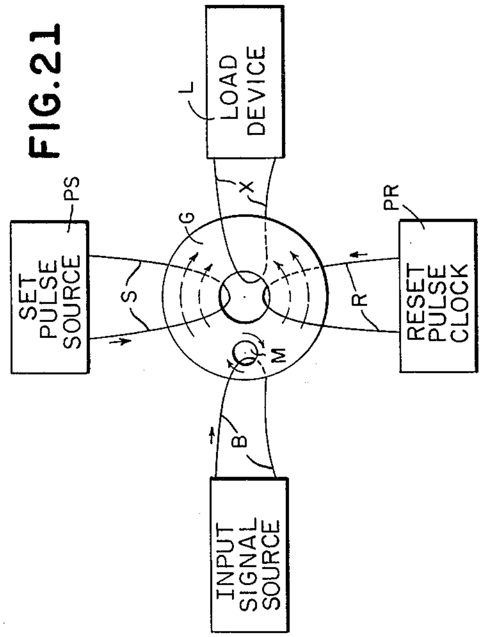

To illustrate one of the further modifications a "not" circuit arrangement employing a type B input winding arrangement with a type X output winding is shown in FIGURE 21. The input winding B embraces the outer portion of the main flux path through opening M and the output winding X embraces the complete magnetic circuit like the set winding S and reset winding R. The sequence of operation is the same as that described for FIGURE 20 with the reset winding pulsed first followed by a pulse to the set winding after an input interval has elapsed. With no input signal received, the set winding S reverses the flux direction and develops a large output signal on winding X. On the other hand, if an input is applied to winding B, and in the direction shown, the crescent shaped flux pattern is developed and, while an output signal is obtained at this time and again when the set winding is pulsed, this output signal is substantially half the magnitude of that developed without receipt of an input and may be amplitude discriminated by the load L.

A further logical function termed inhibit, that comprises a device which provides an output pulse unless an input signal is applied, may be formulated using the principles set forth. For example with the winding arrangement shown in FIGURE 4, the source P1 may comprise a source of clock pulses functioning through winding A to provide an output pulse on the winding X when a shift in state from "a" to "c" or "b" to "d" is caused by developing the crescent shaped flux pattern. With source P2 functioning to block this action through the oppositely wound winding A′, no output signal is obtained and the inhibit or "not" function is accomplished.

Figure 22:
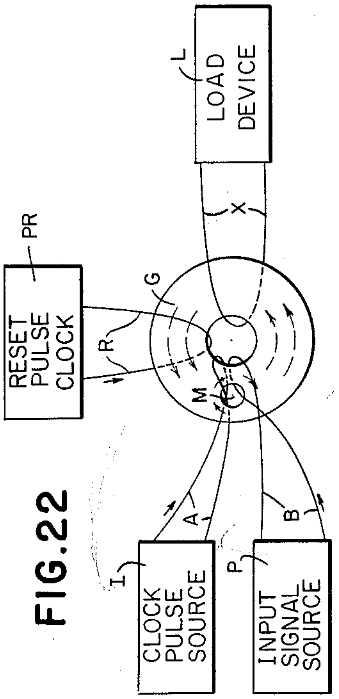

Another arrangement for performing the inhibit function is obtained by employing the combination of an A and B type input winding with a type X output winding and such an embodiment is shown in FIGURE 22 where the inhibit clock pulse source is indicated by the label I. Here the winding A causes kidneying and develops an output in the winding X with each clock pulse and on each resetting action of source PR. The winding B which links the inner flux path opposes such kidneying of the flux when energized so that no appreciable flux change occurs when the input and clock pulse sources are concurrently activated. Obviously, this arrangement may also embody output windings of type Z, or windings of type Y may be used along with a winding of type Z that is short circuited.

Figure 23:
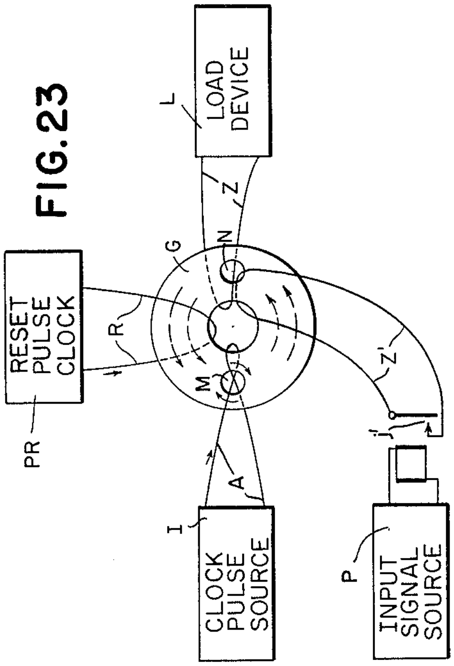

Still another modification of the inhibit circuit may be provided with a single input winding and using a combination of output winding types as seen in FIGURE 23. Here two windings of type Z are used with a winding of type A employed for energization by the clock source I. Each clock pulse applied to the figure eight winding A causes the crescent shaped flux pattern to be established with the flux change occurring in the inner flux path of the core to develop an output signal in the load L. When an input signal is applied by source P, however, the switch *j*′ is caused to operate shorting the winding Z′ and preventing any flux change in the portion of the core linked by the output winding Z. The switch *j*′ is shown diagrammatically as an electromagnetic relay but it is to be understood that electronic devices, transistors, or saturable reactor devices may be used for this purpose.

In accordance with this invention, novel logical devices can be provided using magnetic structures presenting advantageous economy in fabrication cost and space requirements. Since no external energy is required to maintain the stable magnetic states attained by such elements, the power dissipation of apparatus using these devices is considerably reduced.

It should be understood that while the several embodiments illustrated disclose axial apertures employed by the several input winding arrangements, the main flux path may be divided into two auxiliary paths at the input end of the structure by radial openings as well. Further, while in all instances single turn coils are illustrated, the winding turns may be increased to any desired number compatible with usual pulse transfer tenchiques.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A magnetic core logical device comprising a magnetic circuit capable of assuming stable remanence conditions and having input and output portions with at least the input portion thereof divided into auxiliary legs, a pair of input winding means coupled with only one of said auxiliary legs, reset winding means inductively coupled with said magnetic circuit and adapted when energized to establish a remanence flux throughout said magnetic circuit in one directional sense, output winding means coupled with at least a part of the output portion of said magnetic circuit, and means for energizing said reset winding subsequent to an interval during which input signals may be applied to said device.

2. A universal magnetic core logical device comprising a magnetic circuit capable of assuming stable remanence conditions and having input and output portions each divided into first and second auxiliary parallel legs, input winding means linking said first and second auxiliary legs at said input portion, output winding means linking said first and second auxiliary legs at said output portion, said input and output winding means comprising coils individually exclusive to each leg and linking both the first and second leg at the associated portion.

3. A magnetic core logical device comprising a closed magnetic circuit capable of assuming stable remanence conditions and having a portion thereof divided into at least a first and second auxiliary leg and a further portion divided into at least a third and fourth auxiliary leg, input winding means comprising a pair of oppositely poled figure eight windings linking said first and second auxiliary legs in like configuration, output winding means linking at least one of said third and fourth auxiliary legs, and reset winding means linking said magnetic circuit.

4. A logical circuit element comprising a closed magnetic circuit capable of assuming stable remanence conditions and comprising a loop of magnetic material one portion of which includes a pair of input legs and another portion including a pair of output legs, reset winding means embracing said loop of magnetic material and adapted to establish a remanence flux in one direction in said magnetic circuit, a pair of input winding means each embracing at least one of said input legs and adapted when energized to provide a magnetomotive force therein opposed to said one direction, and output winding means embracing the innermost output leg.

5. A logical circuit element comprising a closed magnetic circuit capable of assuming stable remanence conditions and comprising a loop of magnetic material including a pair of input legs and a pair of output legs, reset winding means embracing said loop of magnetic material and adapted to establish a remanence flux in one direction in said magnetic circuit, a pair of figure eight input winding means each embracing said pair of input legs, and output winding means embracing the innermost one of said pair of output legs.

6. A logical circuit element comprising a closed magnetic circuit capable of assuming stable remanence conditions and comprising a loop of magnetic material including a pair of input legs defined by an aperture and a pair of output legs, reset winding means embracing said loop of magnetic material and adapted to establish a remanence flux in one direction in said magnetic circuit, a pair of figure eight input winding means each passing through said aperture and embracing said pair of input legs, and output winding means embracing at least one of said pair of output legs.

7. A logical circuit element comprising a closed magnetic circuit capable of assuming stable remanence conditions and comprising a loop of magnetic material including a pair of input legs and a pair of output legs, reset winding means embracing said loop of magnetic material and adapted to establish a remanence flux in one direction in said magnetic circuit, a pair of figure eight input winding means each embracing said input legs, an output winding embracing the outermost one of said output legs, and a short circuited winding embracing the innermost one of said output legs.

8. A logical circuit element comprising a closed magnetic circuit capable of assuming stable remanence conditions and comprising a loop of magnetic material including a pair of input legs and a pair of output legs, reset winding means embracing said loop of magnetic material and adapted to establish a remanence flux in one direction in said magnetic circuit, a pair of input winding means embracing at least one of said input legs, an output winding means embracing one of said output legs, and short circuited winding means embracing at least one of said output legs.

9. An "and not" logical circuit element comprising a closed magnetic circuit capable of assuming stable remanence conditions and comprising a loop of magnetic material including a pair of input legs and a pair of output legs, set winding means embracing said loop of magnetic material and adapted to establish a remanence flux in one direction in said magnetic circuit, reset winding means embracnig said main flux path and adapted to establish a remanence flux in the opposite direction in said magnetic circuit, a pair of input winding means embracing one of said input legs in the same sense and adapted to provide a magnetomotive force in said one direction, and output winding means embracing at least the innermost one of said output legs.

10. A magnetic core logical device comprising a closed magnetic circuit capable of assuming stable remanence conditions and comprising a loop of magnetic material including a pair of input legs and a pair of output legs, reset winding means embracing said loop of magnetic material, and adapted when energized to establish a remanence flux in one direction in said magnetic circuit, a pair of input winding means embracing only one of said input legs, and output winding means embracing at least the innermost one of said pair of output legs, and means for energizing said reset winding means prior to application of input signal pulses to said input winding means.

11. A universal magnetic core logical device comprising a closed magnetic circuit capable of assuming stable remanence conditions and comprising a loop of magnetic material including a pair of input legs and a pair of output legs, set and reset winding means linking said loop of magnetic material, input winding means embracing said input legs, output winding means embracing said output legs, said input winding means comprising coils individually exclusive to each input leg and coils including both of said input legs, means for selectively energizing certain combinations of said input coils, and means for selectively energizing said set and said reset winding means.

12. A magnetic core logical device comprising a closed magnetic circuit capable of assuming stable remanence conditions and comprising a loop of magnetic material including a pair of input legs and a pair of output legs, reset winding means linking said loop of magnetic material, input winding means embracing at least one of said input legs, output winding means embracing at least one of said output legs, control winding means embracing one of said output legs, means for energizing said input winding means, and means for short circuiting said control winding means.

13. A magnetic core logical device comprising a closed magnetic circuit capable of assuming stable remanence conditions and comprising a loop of magnetic material including a pair of input legs defined by an aperture and a pair of output legs, reset winding means linking said loop of magnetic material, input winding means comprising a pair of figure eight coils passing through said aperture and linking said pair of input legs, and output winding means linking at least one of said pair of output legs.

14. A magnetic core logical device comprising a closed magnetic circuit capable of assuming stable remanence conditions and comprising a loop of magnetic material including a pair of input legs and a pair of output legs, reset winding means linking said loop of magnetic material, input winding means comprising individual windings linking a like one of sad input legs and adapted to be energized in a sense opposed to said reset winding means, output winding means associated with at least the innermost one of said output legs and means for sequentially energizing said input and said reset winding means for developing output signals.

15. A logical circuit comprising a magnetic circuit capable of assuming first, second and third different stable states of flux remanenue, a pair of input windings inductively associated with said magnetic circuit, each of said input windings being effective when energized exclusively when said magnetic circuit is in said first stable state to cause said magnetic circuit to assume said second stable state, said input windings being effective when energized coincidently when said magnetic circuit is in said first stable state to cause said magnetic circuit to assume said third stable state, and a pair of output windings inductively associated with said magnetic circuit for respectively manifesting outputs indicative of whether said input windings are energized exclusively or coincidently.

16. A logical circuit comprising a magnetic circuit capable of assuming first, second and third different stable states of flux remanence, a pair of input windings inductively associated with said magnetic circuit, means for energizing said input windings to thereby apply information to said magnetic circuit, each of said input windings being effective when input information is applied exclusively thereto when said magnetic circuit is in said first stable state to cause said magnetic circuit to assume said second stable state, said input windings being effective when input information is applied coincidently thereto when said magnetic circuit is in said first stable state to cause said magnetic circuit to assume said third stable state, and a pair of output windings inductively associated with said magnetic circuit for respectively manifesting outputs indicative of the information applied to said circut by said input windings.

17. The invention as claimed in claim 16 wherein said magnetic circuit includes a core of magnetic material having first and second openings therein and said pair of input windings are positioned through said first opening and said pair of output windings are positioned through said second opening.

18. A logical circuit for storing the results of information applied thereto, a pair of windings, means for energizing said windings to apply input information to said logical circuit, a magnetic circuit inductively associated with said windings and normally in a first stable state of flux remanence but responsive to exclusive energization of either of said windings to assume a second stable state of flux remanence and to coincident energization of said windings to assume a third stable state of flux remanence, an interrogation winding inductively associated with said magnetic circuit, means for energizing said interrogation winding, and output winding means comprising a pair of individual windings inductively associated with said magnetic circuit for respectively manifesting outputs indicative of which of said stable states said magnetic circuit is in when said interrogation winding is energized.

19. A logical circuit for storing the results of information applied thereto, a pair of windings, means for energizing said windings to apply input information to said logical circuit, a magnetic element inductively associated with said windings and normally in a first stable state of flux remanence but responsive to exclusive energization of either of said windings to assume a second stable state of flux remanence and to coincident energization of said windings to assume a third stable state of flux remanence, an interrogation winding inductively associated with said magnetic element, means for energizing said interrogation winding, and a pair of output windings inductively associated with said magnetic element for manifesting outputs indicative of which of said stable states said magnetic element is in when said interrogation winding is energized.

20. A logical circuit for storing the results of information applied thereto, a pair of input windings, means for energizing said input windings to apply input information to said logical circuit, a magnetic circuit inductively associated with said input windings and normally in a first stable state of flux remanence but responsive to exclusive energization of either of said input windings to assume a second stable state of flux remanence and to coincident energization of said input windings to assume a third stable state of flux remanence, an interrogation winding inductively associated with said magnetic circuit, means for energizing said interrogation winding, and a pair of output windings inductively associated with said magnetic circuit for manifesting outputs indicative of the information applied to said logical circuit both upon the energization of said input windings and upon energization of said interrogation winding.

21. A circuit for storing the results of binary addition of information applied to a pair of input windings, means for initially energizing said windings to apply input information to said circuit, a magnetic core inductively associated with said input windings and normally in a first unbiased stable state of flux remanence but responsive to exclusive energization of either of said input windings to assume a second unbiased stable state of flux remanence and to coincident energization of said input windings to assume a third unbiased stable state of flux remanence, an interrogation winding inductively associated with said magnetic core, means for subsequently energizing said interrogation winding, and a pair of output windings inductively associated with said magnetic core and effective both upon said initial energization of said input winding and upon said subsequent energization of said interrogation winding to manifest outputs indicative of the information initially applied to said input windings.

22. A magnetic logical device comprising a magnetic circuit capable of assuming stable remanence conditions and having a first portion divided into at least two parallel flux paths, means for producing flux individually in each of the parallel flux paths of said first portion, means responsive to variations in flux in a first part only of a second portion of said magnetic circuit, and means responsive to variations in flux in a second part only of said second portion of said magnetic circuit.

23. A magnetic logical device comprising a magnetic circuit capable of assuming stable remanence conditions and having a first portion divided into at least two parallel flux paths, means for producing flux individually in each of the parallel flux paths of said first portion, means responsive to variations in flux in a first part only of a second portion of said magnetic circuit, and further means responsive to variations in flux in said second portion of said magnetic circuit.

24. A magnetic core memory device comprising a closed loop of magnetic material capable of assuming a plurality of different stable states of flux remanence, said core having a plurality of openings positioned therethrough, a first input winding positioned through one of said openings to embrace a first portion only of said magnetic material, a second input winding positioned through said one of said openings to embrace a second portion only of said magnetic material which is adjacent said first portion, a third winding positioned through another of said openings to embrace a portion of said magnetic material remote from said first and second portions, and a fourth winding positioned through said another of said openings to embrace a portion of said magnetic material.

25. The invention as claimed in claim 24 wherein said openings are positioned through said magnetic material substantially at the center line of said loop.

References Cited in the file of this patent

UNITED STATES PATENTS

| | | |
|---|---|---|
| 2,497,499 | Hedding | Feb. 14, 1950 |
| 2,519,426 | Grant | Aug. 22, 1950 |
| 2,640,164 | Giel | May 26, 1953 |
| 2,730,694 | Williamson | Jan. 10, 1956 |
| 2,733,424 | Chen | Jan. 31, 1956 |
| 2,770,738 | Vance | Nov. 13, 1956 |
| 2,776,380 | Andrews | Jan. 1, 1957 |
| 2,810,901 | Crane | Oct. 22, 1957 |
| 2,818,556 | Lo | Dec. 31, 1957 |
| 2,842,755 | Lamy | July 8, 1958 |
| 2,869,112 | Hunter | Jan. 13, 1959 |

OTHER REFERENCES

"A New Nondestructive Read for Magnetic Cores," (Thorensen) 1955, Western Joint Computer Conference, March 1955, pp. 111–116 (FIGS. 3 and 5, pp. 113–114 relied on).

"Magnistor Circuits" (Snyder), Electronic Design, August 1955, pp. 24–27 (FIG. 1, page 25 relied on).

"The Transfluxor" (Rajchman), Proceedings of the IRE, March 1956, vol. 44, pp. 321–332.

UNITED STATES PATENT OFFICE

CERTIFICATE OF CORRECTION

Patent No. 3,077,582 February 12, 1963

Edwin W. Bauer

It is hereby certified that error appears in the above numbered patent requiring correction and that the said Letters Patent should read as corrected below.

Column 13, line 34, for "embracnig said main flux path" read -- embracing said loop of magnetic material --; column 14, line 25, for "remanenue" read -- remanence --.

Signed and sealed this 24th day of September 1963.

(SEAL)
Attest:

ERNEST W. SWIDER
Attesting Officer

DAVID L. LADD
Commissioner of Patents